United States Patent [19]

Kim

[11] 4,443,414
[45] Apr. 17, 1984

[54] PROCESS FOR SEPARATION OF MOLYBDENUM FROM TUNGSTEN LEACHATES

[75] Inventor: Bang M. Kim, Schenectady, N.Y.

[73] Assignee: General Electric Company, Schenectady, N.Y.

[21] Appl. No.: 407,964

[22] Filed: Aug. 13, 1982

[51] Int. Cl.$^3$ .................. C01G 39/00; C01G 41/00
[52] U.S. Cl. .................. 423/54; 75/101 BE; 210/651; 210/652; 423/658.5
[58] Field of Search .................. 423/54, 658.5; 75/101 BE; 210/651, 652

[56] References Cited

U.S. PATENT DOCUMENTS

| | | | |
|---|---|---|---|
| 3,957,504 | 5/1976 | Ho et al. | 75/101 BE |
| 3,969,478 | 7/1976 | Zelikman et al. | 423/54 |
| 4,051,230 | 9/1977 | Miyauchi | 423/54 |
| 4,092,117 | 5/1978 | Byrne | 210/644 |
| 4,275,039 | 1/1981 | Ozensoy et al. | 423/54 |
| 4,306,946 | 12/1981 | Kim . | |

Primary Examiner—Herbert T. Carter
Attorney, Agent, or Firm—Lawrence D. Cutter; James C. Davis, Jr.; Marvin Snyder

[57] ABSTRACT

A method for the removal of molybdenum from solutions containing molybdenum and other mineral values such as tungsten is accomplished by mixing the leachate solution with hydrogen peroxide to form a feed solution; the feed solution is contacted with a porous membrane, the opposite side of which is continuously contacted with an organic solution containing tributylphosphate. Additionally, for recovery of molybdenum, the tributylphosphate solution is additionally contacted with a second membrane the opposite side of which is contacted with a stripping solution such as a solution of sodium hydroxide or sodium carbonate. In a continuous ion exchange embodiment, the organic solution containing tributylphosphate is recirculated to contact the second side of the first membrane, preferably after passage through an aqueous separator.

6 Claims, 1 Drawing Figure

PROCESS FOR SEPARATION OF MOLYBDENUM FROM TUNGSTEN LEACHATES

BACKGROUND OF THE INVENTION

The present invention relates to a method for the removal of molybdenum from solutions containing it and also to methods for the separtion of molybdenum and tungsten in leachate solutions containing both of these mineral species.

Molybdenum is one of the major contaminants in tungsten ores. Furthermore, it is necessary to remove as much of the molybdenum as possible in order to produce high purity tungsten products. However, since molybdenum has similar properties to tungsten in terms of its oxidation potential, its solubility, and its extraction coefficient, the separation of these two mineral values by conventional means is extremely difficult.

For example, U.S. Pat. No. 2,963,343, issued Dec. 6, 1960 to Pilloton, discloses a process for the separation of molybdenum from tungsten in leachate solutions. In this process, the leachate is acidified and reacted with sodium hydrosulfide (NaSH), molybdenum being precipitated as molybdenum trisulfide. However, this process exhibits several disadvantages. These include the loss of tungsten values through the occurrence of co-precipitation with molybdenum sulfide. Additionally, difficult filtration requirements add significantly to equipment cost and operational difficulties. Lastly, this commercial method results in the generation of hydrogen sulfide, which is well known to be noxious.

Another process for the separation of molybdenum from tungsten-containing solutions is described in the article "The Recovery of Molybdenum From Spent Mandrel Acid by Solvent Extraction" by D. S. Flett, J. Mellig and E. W. West on pages 80–149 of the Proceedings of the International Solvent Extraction Conference, held Sept. 6–12, 1980 in Leige, Belgium. In this process, solvent extraction using di-2-ethylhexyl phosphoric acid (DEHPA) has been proposed utilizing the cationic nature of molybdenum at low pH levels. However, the high separation factor for molybdenum over tungsten is not achieved due to the presence of anionic molybdenum species including molybdenum-tungsten heteropolyanions.

Yet another process for the separation of molybdenum and tungsten by solvent extraction is disclosed in U.S. Pat. No. 3,969,478, issued July 13, 1976 to Zelikman et al. In this process, the molybdenum and tungsten-containing solution is acidified and reacted with hydrogen peroxide to form peroxide complexes. The separation of tungsten and molybdenum is carried out using tributylphosphate (TBP). The physical characteristics of tributylphosphate, particularly its high viscosity and low density, cause the process of Zelikman et al. to suffer from operational problems in the use of mixer/settler devices and further renders the separation of the aqueous and organic phases difficult. The difficult separation is caused by slow settling and by the formation of stable emulsions. Moreover, in using this process in a mixer/settler apparatus, it is highly desirable to maintain a ratio of organic to aqueous phase of from 1 to 1.5. However, as more particularly pointed out below, such a limitation is not at all present in the novel method disclosed herein. Furthermore, the method described in the patent to Zelikman et al. also requires a stabilizer in order to use the method with the extraction equipment. Moreover, dilution of TBP with organic solvents to counteract these problems impairs the ability of the TBP to separate the molybdenum and tungsten species.

Another process for the separation of tungsten and molybdenum by solvent extraction is disclosed in U.S. Pat. No. 4,275,039, issued June 33, 1981 to Özensoy et al. This patent discloses a method for overcoming some of the problems associated with the process described in the above-mentioned patent to Zelikman et al. The process of Özensoy et al. also uses reaction of hydrogen peroxide with a feed solution containing molybdenum and tungsten so as to form peroxide complexes. The process particularly employs an extracting solution comprising DEHPA, TBP and tributylphosphine oxide (TPO), and also hydrocarbon diluents of low aromatics content. However, this process still exhibits some of the problems associated with mixer/settler types of separation operation. These problems include difficult phase separation, emulsion formation, solvent loss and stringent requirement for minimum particulate content in the feed solution. Furthermore, this process is one that should be performed in a multi-stage operation to exhibit a high enrichment factor.

In U.S. Pat. No. 4,306,946, issued Dec. 22, 1981 in the name of the instant inventor, Donnan dialysis is employed as a continuous ion exchange process in the treatment of hydrometallurgical solutions. This process employs a solid ion exchange membrane as a barrier between feed and eluant solutions. However, the method is limited by the diffusion rate of ions through the solid ion exchange membrane. However, it is nonetheless a continuous method and provides many advantages over conventional batch-wise processing, which requires a complex flow scheme and consequently high equipment cost.

Another method of metal recovery is described in the article "Coupled Transport Membranes" by R. W. Baker et al. in the Journal of Membrane Science, Vol. 2, pages 213–233, 1977. The process described therein employs a single porous membrane which is impregnated with a liquid ion exchange material in the barrier. However, this process exhibits certain shortcomings, particularly membrane instability. For example, the liquid ion exchange material has a tendency to leach out from the membrane due to its finite solubility in water.

Additionally, a process for hydrometallurgical extraction is described in U.S. Pat. No. 3,957,504, issued May 18, 1976 to Ho et al. FIG. 4 of the patent to Ho et al. is particularly relevant in that it illustrates a hydrometallurgical extracting flow diagram in which a chelating fluid is recycled back to a first membrane extraction unit. However, no provision is made in the apparatus of Ho et al. for treatment of recycled chelating solutions. In particular, there is no provision for the use of an aqueous organic separator or extractor which the present inventor has found to be particularly effective in selectively isolating desired metallic species, even when mixed with solutions containing ferric or ferrous ions. Additionally, there is no provision for a peroxidation step such as is employed in the present invention. Lastly, Ho et al. are not appreciative of the particular problems associated with the separation of molybdenum and tungsten species.

The present invention is distinct from the above-described methods for several reasons, most notably in that liquid ion exchange material is not in direct contact with the aqueous feed nor impregnated in a membrane but rather is disposed in a preferably recirculating system between separate membranes in distinct fluid-tight chambers. The present invention employs indirect contact of an organic extraction solution and the aqueous leachate solution across a solid membrane barrier. It particularly enables the use of any type of organic solvent with significantly less stringent requirements on the physical properties of the organic solvent. Accordingly, the limitations on the aqueous-to-organic phase volume ratios are not even applicable to the present invention. Additionally, the present invention does not require the use of stabilizer materials to provide phase separation. Moreover, the present invention is particularly aimed at eliminating the problems of particulate contamination, emulsion formation and phase separation associated with mixer/settler methods of molybdenum/tungsten separation.

SUMMARY OF THE INVENTION

In accordance with a preferred embodiment of the present invention, a method for the removal of molybdenum from leachate solutions containing molybdenum comprises the steps of mixing the leachate solution with hydrogen peroxide to depolarize molybdenum and tungsten polyanions and to form molybdenum peroxide complexes so as to produce a feed solution which is contacted with a porous membrane, the opposite side of which is contacted with an organic solution containing tributylphosphate. Additionally, in a further embodiment of the present invention, the TBP solution is further contacted with the first side of a second membrane, the opposite side of which is contacted with an eluant solution for the selective passage of molybdenum through the second membrane. Accordingly, this latter embodiment of the present invention provides not only for the separation of molybdenum from tungsten leachate solutions, but also for the separate recovery of molybdenum itself. In a preferred embodiment of the present invention, the TBP solution is recirculated back so as to recontact the second side of the first membrane, and the recirculating flow preferably passes through an aqueous separator from which excess water is preferably periodically removed.

Accordingly, it is an object of the present invention to provide a method for the separation of tungsten and molybdenum in leachate solutions.

It is a further object of the present invention to provide for recovery of both tungsten and molybdenum from leachate solutions in which both are contained.

It is also an object of the present invention to eliminate the problems associated with mixer/settler forms of tungsten/molybdenum separation, such as phase separation, loss of solvent, and particulate contamination in the feed solution.

Lastly, it is an object of the present invention to provide a method for solvent extraction of molybdenum and tungsten in which the selection of the organic solvent is not limited by those physical properties which are particularly related to emulsion formation.

DESCRIPTION OF THE FIGURE

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

DETAILED DESCRIPTION OF THE INVENTION

Figure 1:
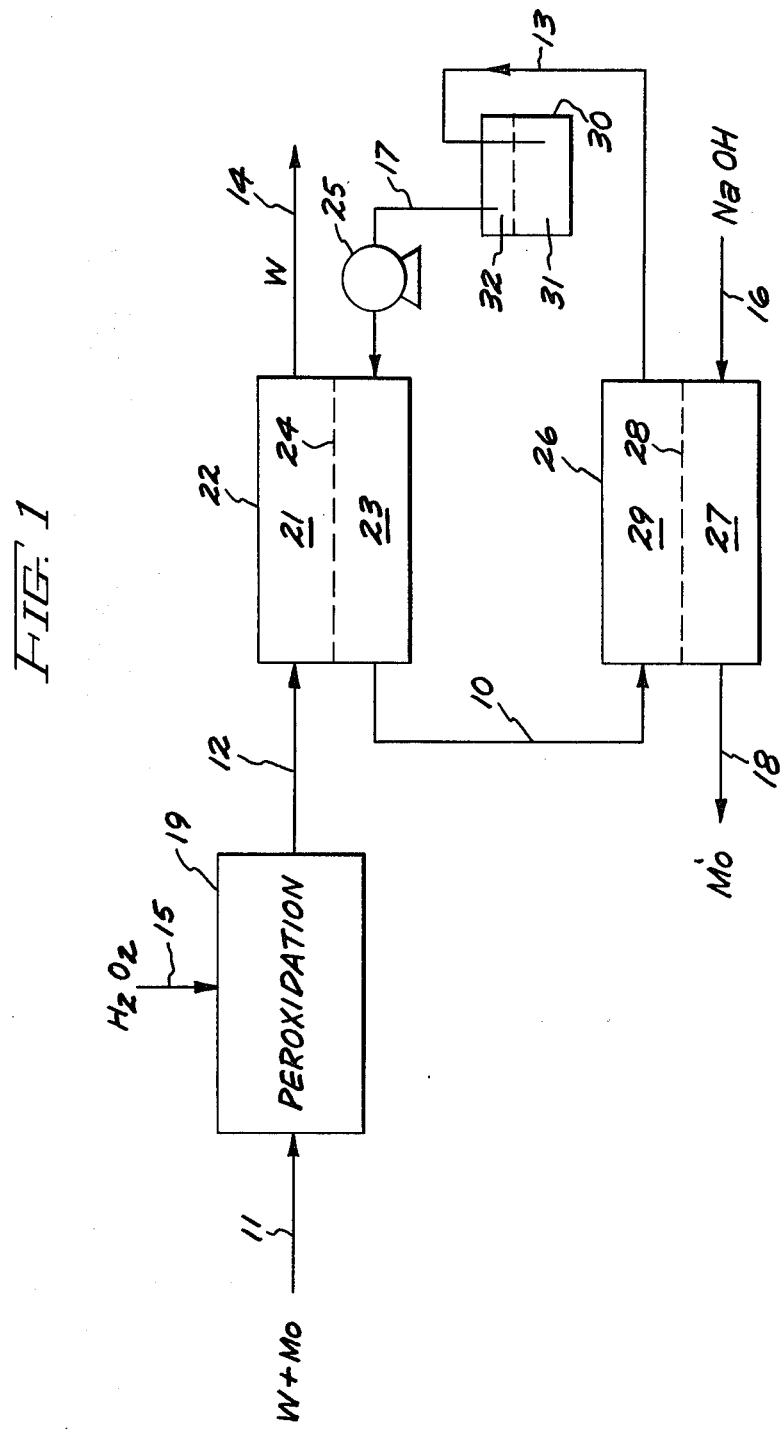
FIG. 1 is a schematic diagram illustrating a process in accordance with a preferred embodiment of the present invention.

In a process in accord with the present invention, a leachate solution 11 containing molybdenum and tungsten is supplied to mixing vessel 19 to which is also supplied solution 15 containing hydrogen peroxide. The peroxidation step of the present invention serves to depolarize the molybdenum-tungsten polyanions and to form peroxide complexes. Resultant feed solution 12 is supplied to volume 21 of a first fluid-tight chamber 22 containing volumes 21 and 23 separated by membrane 24. Membrane 24 preferably comprises a hollow fiber form of membrane device. Volume 23 of chamber 22 is filled with a circulating solution containing tributylphosphate as an intermediary solution for the extraction of molybdenum. The presence of the tributylphosphate or other molybdenum selective organic solution causes the selective passage of permolybdates through membrane 24. In the present invention, there is no limitation on the concentration of tributylphosphate in the intermediary solution. In particular, higher concentrations of TBP are preferred.

In a preferred embodiment of the present invention, intermediary solution 10 from volume 23 is supplied to volume 29 of second fluid-tight chamber 26 which is also divided interiorly by means of second membrane 28 so as to thereby define volumes 29 and 27. Intermediary solution 10 is supplied to volume 29 in which it is contacted with a first side of second membrane 28. Volume 27 contains alkaline solution 16 for selective passage of molybdenum values through membrane 28. Solution 16 comprises an alkaline solution such as a solution of sodium hydroxide or sodium carbonate. Thus, discharge 18 from volume 27 contains a high concentration of molybdenum values which may be recovered using conventional processes.

In a preferred embodiment of the present invention, intermediary solution 13 from volume 29 is recirculated by means of pump 25, back to volume 23, so as to form a continuous ion exchange process for the separation of molybdenum. In the present invention, it is preferred that intermediary solution 13 be processed through aqueous separator 30 from which aqueous portion 31, periodically removed and from which the de-aquified solution of tributylphosphate 17 is removed from upper layer 32 in separator 30. Additionally, an aqueous separator may also be employed to process solution 10, either instead of or in addition to separator 30 which is shown in FIG. 1.

The tungsten contained within solution 14 is recovered using conventional methods which now have an advantage in that special consideration for the presence of molybdenum values need no longer be employed. It is accordingly seen that the present process is applicable to the purification of tungsten leachate solutions formed in the processing of tungsten bearing ores. Additionally, in the present invention a ratio of at least 0.7 mol of hydrogen peroxide to each mol of total molybdenum and tungsten is preferred since this ensures the formation of permolybdates. The pH of this solution is preferably less than 2.

In an experimental test of the present invention, a solution containing 2,000 ppm of molybdenum and 2,000 ppm of tungsten was reacted with hydrogen peroxide to break up tungsten-molybdenum polyanions. The solution was next fed to a hollow fiber separator using 100% tributylphosphate as an extracting solution and an alkaline stripping solution. In single-pass continuous flow experiments, more than 97% of molybdenum was removed, while only less than 5% of tungsten present in the feed solution was thereby removed.

Accordingly, from the above it should be appreciated that the present invention provides an economical and efficient process for the removal of molybdenum from tungsten leachate solutions, such as those obtained from hydrometallurgical mining processes applied to scheelite ores. It is further seen that the present invention provides an efficient process for the production of molybdenum values as a byproduct from the hydrometallurgical mining of tungsten. It is further seen that the present invention obviates many of the problems associated with the specific physical properties of molybdenum selective organic solvents such as TBP, particularly their physical properties involving emulsion formation and viscosity.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for the separation of molybdenum and tungsten in leachate solutions containing them, comprising the steps of:

mixing a leachate solution with a hydrogen peroxide to form an aqueous feed solution;

contacting said feed solution with one side of a first porous membrane;

contacting the second side of said first membrane with an organic molybdenum selective solvent operating to produce the selective passage of molybdenum through said first membrane;

contacting the organic solvent which has been in contact with the second side of said first porous membrane with the first side of a second, porous membrane;

contacting the second side of said second membrane with an alkaline solution for the selective passage of molybdenum through said second membrane;

recirculating said solvent solution which has been in contact with said first side of said second membrane, through an aqueous separator, and thence to the second side of said first membrane.

2. The method of claim 1 in which said organic solvent comprises tributylphosphate.

3. The method of claim 1 in which said alkaline solution is selected from the group consisting of solutions of sodium hydroxide and sodium carbonate.

4. The method of claim 1 in which said mixing employs at least 0.7 mol of hydrogen peroxide for each mol of total molybdenum and tungsten in said leachate solution.

5. The method of claim 1 in which said membranes comprise hollow fibers.

6. The method of claim 1 in which the mixing results in a solution having a pH less than 2.

* * * * *